United States Patent [19]

Hoenel et al.

[11] 3,950,286
[45] Apr. 13, 1976

[54] COATING PROCESS AND COMPOSITION
[75] Inventors: Herbert Hoenel; Heinrich Lackner, both of Graz, Austria
[73] Assignee: Vianova Kunstharz, A.G., Vienna, Austria
[22] Filed: July 16, 1970
[21] Appl. No.: 55,571

Related U.S. Application Data
[63] Continuation-in-part of Ser. No. 586,589, Sept. 20, 1966, abandoned.

[30] Foreign Application Priority Data
Sept. 21, 1965 Austria .............................. 8592/65

[52] U.S. Cl................. 260/19 R; 260/21; 260/29.3; 260/25
[51] Int. Cl.$^2$......................................... C08B 91/00
[58] Field of Search............. 260/18 R, 19, 29.3, 21

[56] References Cited
UNITED STATES PATENTS

| | | | |
|---|---|---|---|
| 3,251,791 | 5/1966 | Goodchild | 260/19 |
| 3,300,424 | 1/1967 | Hoenel et al. | 260/21 |
| 3,351,675 | 11/1967 | Gilchrist | 260/29.3 |

*Primary Examiner*—Donald E. Czaja
*Assistant Examiner*—W. E. Parker
*Attorney, Agent, or Firm*—A. W. Breiner

[57] ABSTRACT

A process of making water-soluble coating compositions is described characterized in that (A) an adduct of an alpha-beta ethylenically unsaturated dicarboxylic acid or anhydride with olefinic, unaltered or polymerized, oil fatty acids, or mixtures of such acids with other unsaturated carboxylic acids or natural esters thereof, or hydroxy-free polyol esters thereof; (B) a polyhydroxy compound; and (C) a water-insoluble, hardenable phenol-aldehyde condensation product of a phenol substituted in the ortho- or para-position with an alkyl radical having at least three carbon atoms, are combined at an elevated temperature to form a homogeneous resinous body; and the resin thereafter made water-soluble through the addition of a water-soluble nitrogen base. The water-soluble coating compositions are particularly useful for electrodeposition providing films having improved surface characteristics and corrosion resistance.

14 Claims, No Drawings

COATING PROCESS AND COMPOSITION

This application is a continuation-in-part of U.S. application Ser. No. 586,589 filed Sept. 20, 1966, now abandoned.

This invention relates to improved coating compositions and to their method of manufacture. More particularly, the invention is directed to water-soluble coating compositions which are particularly suitable for electrodeposition to provide films having improved surface characteristics, throwing power, corrosion resistance, and mechanical properties.

U.S. Pat. No. 2,681,894 discloses water-soluble resins for stoving enamels produced by mixing a low molecular weight, hardenable phenol-aldehyde condensation product which is water soluble or at least hydrophilic, with a plasticizing resin which forms a soap upon addition of a nitrogen base. U.S. Pat. Nos. 2,981,703 and 2,981,710; and British Pat. Nos. 961,029 and 1,019,658 disclose aqueous stoving enamels prepared from similar mixtures. British Pat. No. 1,019,658 acknowledges that the mixtures are suitable for electrodeposition.

The aforesaid prior art stoving enamels can be applied by conventional spraying, dipping, or flow coating techniques. However, they cannot be used or only used with great difficulties when application is by electrodeposition. The components of the physical mixture do not depose on the anode according to their relative quantities in the bath and, accordingly, the film obtained is not uniform. Additionally, the bath composition changes with time, making continuous coating impossible.

Water-soluble synthetic resins which are better adapted for electrodeposition are suggested in U.S. Pat. Nos. 3,351,675 and 3,297,557. These resins are the reaction products of select adducts with non-hardenable phenolic resins. U.S. Pat. No. 3,251,791 describes water-dilutable synthetic resins which are produced by heating a mixture of a fatty acid adduct of ethylenically unsaturated dicarboxylic acids with a resol and a polyol. The resols in this case are formaldehyde condensation products of m-cresol or 2,4-xylenol. U.S. Pat. No. 3,300,424 discloses physical or partially esterified mixtures of adducts with various polyhydroxy compounds. However, the reference does not suggest a choice of specific phenol condensates in order to obtain coating compositions suitable for electrodeposition.

It has now been found that electro-deposited films with improved properties — more particularly with regard to the quality of the surface of the film, throwing power, corrosion resistance, and mechanical properties — are obtained if binding agents are employed which are characterized in that (I) an adduct of an alpha-beta ethylenically unsaturated dicarboxylic acid or anhydride with olefinic unaltered or polymerized oil fatty acids or mixtures of such acids with other unsaturated carboxylic acids, or with natural esters of the aforementioned substances, or with hydroxy-free polyol esters of the aforementioned substances which can be produced without or with the co-employment of polycarboxylic acids; (II) a polyhydroxy compound; and (III) a water-insoluble, optionally alkali-soluble, hardenable phenol-aldehyde-condensation product of a phenol substituted in the ortho- or para-position by an alkyl radical with at least three carbon atoms, are combined at elevated temperature to form a homogeneous resinous body and the resin made water-soluble through the addition of a water-soluble nitrogen base.

Through the use of water-insoluble phenol-aldehyde condensation products containing alkyl radicals with more than three carbon atoms, the entire resin system becomes highly hydrophobic, which feature provides substantial advantages when the present coating compositions are deposited electrophoretically. Inherent to electrodeposition is an endosmotic displacement of the water acting as solvent of the binder. Through the hydrophobic character of the binding agent this endosmotic displacement is substantially accelerated and the thereby much denser formation of a film essentially increases the throwing power of the binding agent. The density of the film also substantially prevents the decomposition of the zinc or iron phosphatizing on the objects during electrophoresis and, thus, increases the corrosion resistance.

The adducts employed herein are formed through the reaction of alpha-beta ethylenically unsaturated dicarboxylic acids or their anhydrides, such as maleic acid, maleic anhydride, or fumaric acid with olefinic fatty acids, e.g., linoleic acid and its isomers, linolenic acid and its isomers, elaeostearic acid and similar acids, alone or in mixture, in unaltered or polymerized form, or also with natural esters of the above-mentioned fatty acids, such as vegetable or animal oils, e.g., linseed oil, soya bean oil, tung oil, fish oils, alone or as a mixture, unaltered or polymerized. Furthermore, the adducts can be produced from technical unsaturated fatty acids, such as tall oil fatty acid, rosin, or partially hydrated rosin acids. Specially suitable for the adduct formation is dehydrated castor oil or its fatty acids. Although dehydrated castor oil readily forms gels during the adduct formation, adducts with a high content of dehydrated castor oil can be produced with special measures. The hydroxy-free polyol esters of the above-mentioned acids can also be used for the adduct formation, suitable polyols being exemplified by glycerol, trimethylolpropane, pentaerythritol, and other polyhydric alcohols.

Polyhydroxy compounds which can be employed herein are the polyols, such as trimethylol propane, pentaerythritol, 1,3-butylene glycol, propylene glycol, etc. If these polyols are used, components (I), (II), and (III) are reacted together. The reaction can be carried out in such a way that, before the esterification of the components sets in, re-esterifications between all reaction components take place, thereby causing a reduction of the viscosity. The best way is to hold the reaction mixture at about 170°C. for several hours under reflux and slight pressure. The subsequent esterification is carried out at from about 160°–170°C. Other polyhydroxy compounds which can be used include partial polyol esters of fatty acids, more particularly tung oil fatty acids. In such instance, the phenol-aldehyde condensation product (III) is first reacted with the polyhydroxy compound (II) above 180°C., and then the adduct (I) is added and the resin formed at about 120°C.

Water-insoluble, hardenable phenol aldehyde condensation products (III) which are used herein, either alone or as mixtures, are the low molecular weight phenol alcohols produced in known manner in alkaline medium through reaction of formaldehyde with, e.g., substituted phenols, such as propyl phenols, butyl phenols, more particularly para tertiary butyl phenol, octyl phenols, such as para tertiary octyl phenol, phenols with two nuclei, e.g., diphenols, such as para- oxy diphenol, diphenylolpropane, etc., also oil reactive, solid phenol resins, produced in known manner by condensation of, e.g., para tertiary butyl phenol and formaldehyde. These condensates can be alkali-soluble.

The resins prepared according to this invention are neutralized with adequate water-soluble nitrogen bases and can be diluted with water to any desired extent. Optionally, minor proportions of hydrophilic solvents, such as diacetone alcohol, ethylene glycol monoethyl ether, ethylene glycol monobutyl ether, ethylene glycol monoisopropyl ether and similar solvents can be co-employed. The composition can be neutralized with nitrogen bases such as ammonia, monoethanol amine, diethanol amine, triethanol amine, isopropanol amines, dimethyl ethanol amine, etc. The most suitable pH-value was found to lie between 6.8 and 8.5.

During the application of the present compositions, to keep the pH-value and the solid content of the electrodeposition bath at the required level, a binder concentrate, with or without pigments, fillers, etc., can be added to the bath, which contains the binding agents of the invention in non-neutralized state or in only partially neutralized state.

Although the binding agents of the present invention are particularly desirable for electrodeposition, they can be applied by spraying, dipping, flow coating, etc.

Having described the invention in general terms, the following examples are being set forth to illustrate preferred embodiments of the invention. They are not, however, to be construed as limiting its scope. Parts are by weight unless otherwise indicated.

EXAMPLE 1

60 grams of rosin are melted together with 20 grams of tall oil fatty acids and 40 grams of linseed oil. Then 200 grams of dehydrated castor oil and 100 grams of maleic anhydride are added. The mass is heated to 200°C. until at least 90% of the maleic anhydride has reacted. 60 grams of tung oil is added to react with the maleic anhydride remaining free and with any maleic or fumaric acid which may have formed. Then 80 grams of 1,2-propylene glycol are added, and at about 130°C. a liquid resol obtained from 20 grams of para tertiary butyl phenol is slowly added. Thereafter, 30 grams of pentaerythritol is admixed. The mass is held at about 170°C. for several hours. It is cooled when the viscosity of a 50% solution in ethylene glycol monobutyl ether has reached 100–120 inch DIN cup No. 4. The acid value is at about 80–90 mg KOH/g. The product obtained (605 grams) is diluted with 60 grams of ethylene glycol monobutyl ether and 61 grams of ethylene glycol monoethyl ether. Upon addition of 410 grams of water and 70–75 grams of triethyl amine (i.e., about 80% of the amount calculated according to acid value), a 50% aqueous solution with a pH-value of about 7.5 is obtained. It can be further diluted with water as desired. For electrodeposition the adequately pigmented product is reduced to a solid content of 20% or less. Best results are obtained with a pH-value of 7.5 as a maximum. A stoving temperature of 180°C. for 15–30 minutes is suitable. The stoved films are characterized by evenness, good gloss, and good salt spray resistance.

Neutralization can also be effected with ammonia or with trimethyl amine, diethyl amine, or other amines.

EXAMPLE 2

160 grams of dehydrated castor oil and 160 grams of linseed oil are held at 270°C. for several hours. After some cooling, 100 grams of maleic anhydride are added and a temperature of 200°C. is held, until 90% of the maleic anhydride has reacted. 80 grams tung oil are later admixed to react with any maleic anhydride having remained free. After cooling to about 140°C., 100 grams of 1,3-butylene glycol are added. After some cooling the humid dialcohol prepared from 40 grams of para tertiary butyl phenol is added. The water is distilled off and the mass is heated to 150°–155°C. and held at this temperature until the acid number has fallen to about 75. Then 64 grams of ethylene glycol monobutyl ether, 520 grams of water, and 44–48 grams of diethyl amine are added to obtain a 50% aqueous solution with a pH-value of about 7.5, which is infinitely dilutable with water.

For electrodeposition the procedure of the foregoing example is followed. The film is stoved at 175°–180°C.

EXAMPLE 3

A substantially neutral mixture is prepared by heating to 250°C. 75 grams of rosin, 75 grams of fish oil (iodine number above 200), 300 grams of dehydrated castor oil, and 10 grams of pentaerythritol. 100 grams of maleic anhydride are reacted completely with this ester to form an adduct. 20 grams of water are admixed and the anhydride groups are hydrolyzed at about 100°C., optionally with the aid of a catalyst. Then 30 grams of trimethylol propane and a resol prepared from 90 grams of para tertiary butyl phenol (substantially the dialcohol) are added, the water is distilled off and the mixture is heated to 120°C. and held at this temperature for a short while until the soft reaction mass becomes somewhat sticky. The product is neutralized with ammonia or one of the mentioned amines, and diluted to 20% with water. The pH-value of this solution is adjusted to about 7.0.

On electrodeposition coatings of 30 microns and above are very easily obtained. For stoving, temperature of 150°–160°C. are sufficient. The stoved films are very hard, yet flexible and exhibit excellent resistance.

The dialcohol used can be replaced by more hydrophobic dialcohols prepared from para tertiary octyl phenol or an aryl phenol. Further, the hardening due to polyesterification can be catalyzed by co-employing about 1–5% of an alkylol amine, particularly diethanol amine. By this measure either the stoving time can be shortened or the stoving temperature can be reduced.

EXAMPLE 4

Two intermediate products (1 and 2) are prepared, which are combined in a separate working step.

1. An adduct is formed from 200 grams of dehydrated castor oil, 100 grams of linseed oil and 100 grams of maleic anhydride by heating first the mixture of the oils to 250°C. for one hour, adding the maleic anhydride at 200°C. and reacting the components, until the maleic anhydride has reacted completely. The anhydride groups of the adduct are hydrolyzed with 20 grams of water as set forth in Example 3.

2. A mixture of fatty acid monoesters is prepared in known manner from 300 grams of tung oil, 60 grams of trimethylol propane and 33 grams of pentaerythritol. This mixture is heated to 180°C. or more together with 110 grams of an oil-reactive solid phenolic resin. The phenolic resin is prepared in known manner from 90 grams of para tertiary butyl phenol and 90 grams of formaladehyde (30 percent).

Both intermediate products are heated together to 120°–125°C. and held until the combination is soluble in dilute ammonia. The reaction time is about 15–30 minutes. This chemical combination can be carried out in the presence of primary and secondary alcohols. The reaction is interrupted by the addition of a water-compatible solvent. A 50% solution is formed by adding 500–550 ml of 2-N ammonia (pH-value about 7.0–7.5). Ammonia can be replaced by a reduced amount of a water-compatible amine. For stoving of an electrophoretically deposited film, a temperature of about 150°C. for 15–20 minutes is sufficient. The obtained film is hard, very flexible, and exhibits excellent gloss. Preferably, the film is dried at about 100°C. before stoving. The film has an extraordinary resistance to saponifying influences which is due to the tung oil and oil reactive phenolic resin.

The oil reactive phenolic resin used in the preparation of intermediate product (2) can be replaced completely or partly by a liquid or crystalline condensation product of another alkyl or aryl phenol, e.g., para-oxy-diphenyl. A part of the blocked phenols used can also be replaced by phenols with more than two reactive positions, e.g., cresols, bisphenol, etc.

EXAMPLE 5

In order to demonstrate the improvement of the products of the invention over, e.g., the products of U.S. Pat. No. 3,251,791, Examples 1 and 3 were modified by using an equivalent amount of the cresol-resol of Example 1-B of U.S. Pat. No. 3,251,791. From the following table the influence of the resol on the properties of the coating composition can be seen.

|  | I Rupture Voltage | II Throwing Power | III Flexibility | IV Surface Appearance | V Salt Spray ASTM |
|---|---|---|---|---|---|
| Example 1 Modified | 200 V | 15 cm | 1.0 | 1.0 | 2 mm |
| Example 1 | 170 V | 10 cm | 2.5 | 1.0 | 4 mm |
| Example 3 Modified | 180 V | 14 cm | 1.0 | 1.0 | 3 mm |
| Example 3 | 160 V | 11 cm | 3.0 | 2.0 | 6 mm |
| Example 4 | 220 V | 17 cm | 1.5 | 1.0 | 2 mm |

Evaluation for III and IV: 1–5 (1 best value)
Flexibility: ball test (1 kilo from 1 m)
Salt Spray Test ASTM B 117-61, mm corrosion at cross incision after 240 hours
Throwing Power:
A one liter plastic cylinder of 6 cm diameter with a disc cathode of 6 cm at the bottom is filled with the test material. The anode is a strip of steel plate having a width of 5 cm. The base end of the anode is placed at a distance of 2 cm from the cathode. The electrical conditions during the deposition are chosen such that at the bottom of the anode a film of 20 microns thickness will form. With increasing distance from the cathode, film thickness will decrease. The distance between 20 microns and 10 microns is measured. The longer the distance, the better the throwing power.

It should be appreciated that the present invention is not to be construed as being limited by the illustrative embodiments. It is possible to produce still other embodiments without departing from the inventive concept herein disclosed. Such embodiments are within the ability of one skilled in the art.

It is claimed:

1. A process for producing water-soluble coating compositions by
A. combining at elevated temperatures
   I. an adduct of maleic anhydride with an olefinic unsaturated compound of the group consisting of vegetable and animal fatty acis, tall oil fatty acid, rosin acids, their hydroxy-free esters with polyols and mixtures thereof;
   II. a polyhydroxy compound of the group consisting of trimethylol propane, pentaerythritol, propylene glycol, and butylene glycol, and partial esters thereof with fatty acids; and
   III. a water-insoluble, heat-hardenable phenol-formaldehyde condensation product, in the resol state, of a phenol substituted in the ortho or para position by a radical with at least 3 carbon atoms and being a member of the groups of alkyl phenols and aryl phenols; and
B. at least partially neutralizing the reaction product of (A) with a water-soluble nitrogen base.

2. Process according to claim 1 characterized in that components (I), (II), and (III) are heated together until a homogeneous but ungelled product is obtained.

3. Process according to claim 1 characterized in that the reaction mixture of component (I) includes the triglycerides, and said triglycerides are re-esterified by heating at temperatures of between 150° and 180°C.

4. Process according to claim 1 characterized in that any anhydride groups of component (I) are hydrolyzed before component (I) is reacted with components (II) and (III).

5. Process according to claim 1 characterized in that the polyhydroxy compound (II) is a partial ester of unsaturated oil fatty acids and said polyhydric alcohols.

6. Process according to claim 5 characterized in that components (II) and (III) are heated together to temperatures above 180°C. before reaction with component (I) takes place.

7. Process according to claim 4 characterized in that the hydrolyzed anhydride groups of component (I) are partially esterified with the reaction product of components (II) and (III).

8. Process according to claim 1 characterized in that component (I) is produced substantially of dehydrated castor oil or its fatty acids.

9. Process according to claim 1 characterized in that component (I) is freed from unreacted alpha-beta ethylenically unsaturated dicarboxylic acid or anhydride.

10. Process according to claim 1 characterized in that components (I), (II), and (III) are free from electrolytes, particularly chlorides.

11. A water-soluble resinous coating composition comprising a water-soluble nitrogen base soap of the reaction product obtained by heating at elevated temperatures
I. an adduct of maleic anhydride with an olefinic unsaturated compound of the group consisting of vegetable and animal fatty acids, tall oil fatty acid, rosin acids, their hydroxy-free esters with polyols and mixtures thereof;
II. a polyhydroxy compound of the group consisting of trimethylol propane, pentaerythritol, propylene glycol, and butylene glycol, and partial esters thereof with fatty acids; and
III. a water-insoluble, heat-hardenable phenol-formaldehyde condensation product, in the resol state, of a phenol substituted in the ortho or para position by a radical with at least 3 carbon atoms and being a member of the groups of alkyl phenols and aryl phenols.

12. Composition of claim 11 wherein the phenol-aldehyde-condensation product is alkali-soluble.

13. Composition of claim 11 wherein the polyhydroxy compound (II) is a partial ester of unsaturated oil fatty acids and polyhydric alcohols.

14. Composition of claim 11 wherein component (I) is produced substantially of dehydrated castor oil or its fatty acids.

* * * * *